United States Patent [19]
Clark

[11] 3,939,521
[45] Feb. 24, 1976

[54] BRUSH CONSTRUCTION

[76] Inventor: Gaylord J. Clark, 4769 Paw Paw Lake Road, Coloma, Mich. 49038

[22] Filed: Oct. 15, 1974

[21] Appl. No.: 514,827

[52] U.S. Cl. .................... 15/179; 15/183; 15/50 C; 15/53 AB
[51] Int. Cl.² .................... A46B 7/10; A46B 13/04
[58] Field of Search ............ 15/179, 181, 182, 183, 15/77, 34, 53, 21 D, 21 E, 50 C, 53 AB

[56] References Cited
UNITED STATES PATENTS

| | | | |
|---|---|---|---|
| 498,659 | 5/1893 | Johnston | 15/182 X |
| 2,616,228 | 11/1952 | Schlegel | 15/182 X |
| 3,109,190 | 11/1963 | Nelson | 15/181 |
| 3,139,641 | 7/1964 | Grogan et al. | 15/182 |
| 3,167,800 | 2/1965 | Mundo | 15/179 |
| 3,349,423 | 10/1967 | Lousberg | 15/183 |
| 3,393,418 | 7/1968 | Mundo | 15/183 |
| 3,529,314 | 9/1970 | Clark | 15/183 |
| 3,751,745 | 8/1973 | Smith, Jr. et al. | 15/183 |
| 3,810,271 | 5/1974 | Mundo | 15/183 |

Primary Examiner—Peter Feldman
Attorney, Agent, or Firm—Woodhams, Blanchard and Flynn

[57] ABSTRACT

A rotary brush construction, particularly for a top brush for washing vehicles including elongate bristles carried on a perforate hollow cylindrical core of relatively small diameter. A plurality of axially short collar units secure the core on a shaft for rotation therewith and are spaced along the inside of the core. The collars each comprise a hub fixed to the shaft and, in one embodiment, a shell radially spaced from the hub by radial web members, for carrying the core. Tension members extend from the hub through the shell and hold the core to the shell. The collars occupy minimal cross-sectional area within the core. Lubricant liquid streams enter the opposite core ends and pass inward through the collars for substantially uniform distribution of liquid within the core. The liquid passes out through the core perforations to lubricate the bristles. The core preferably comprises plural longitudinal sections having differing bristle densities. The core and collar are preferably circumferentially segmented, the collar segments being secured together at the web members thereof. In a modification, a disc extends radially outward from an end of the core to prevent bristle entanglement with brush supports and liquid feed lines. In another embodiment, each hub is secured by radial tension members and spacers to the core, without the said shell, and axially outer hubs are of lesser diameter than axially inner ones.

16 Claims, 8 Drawing Figures

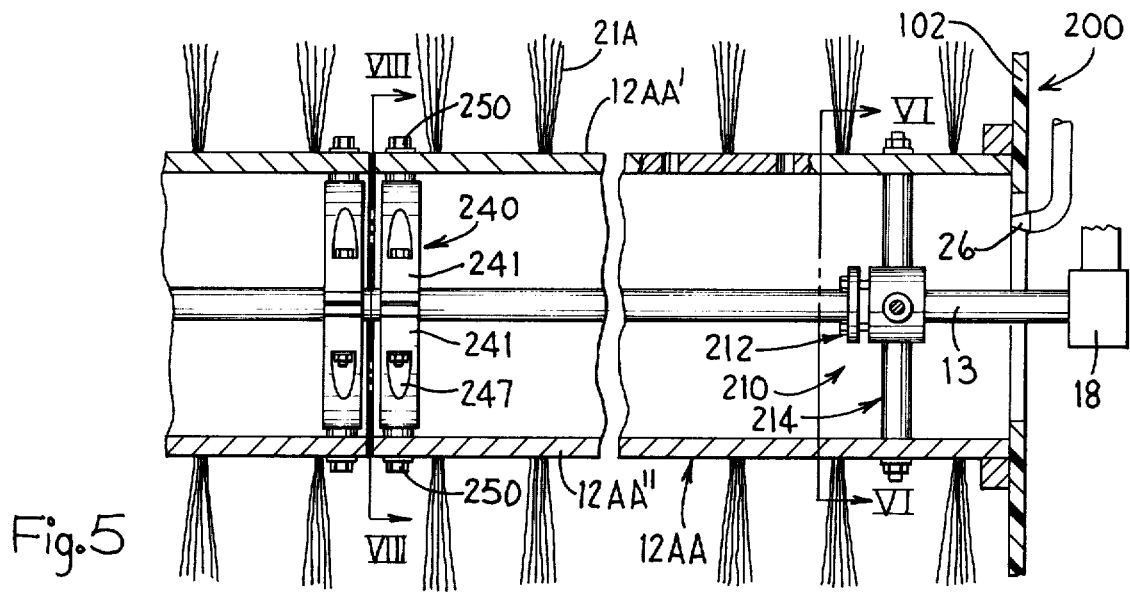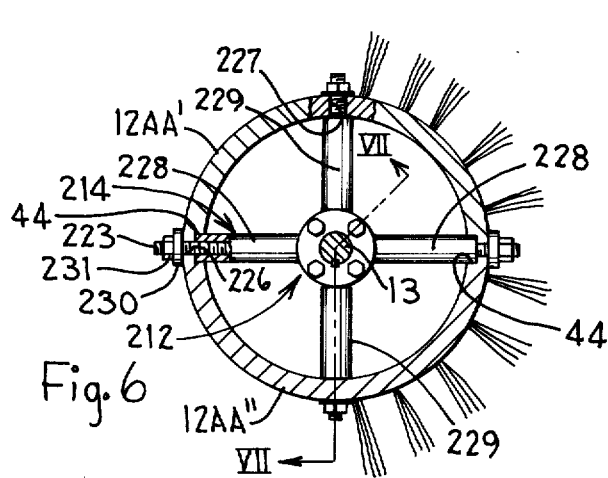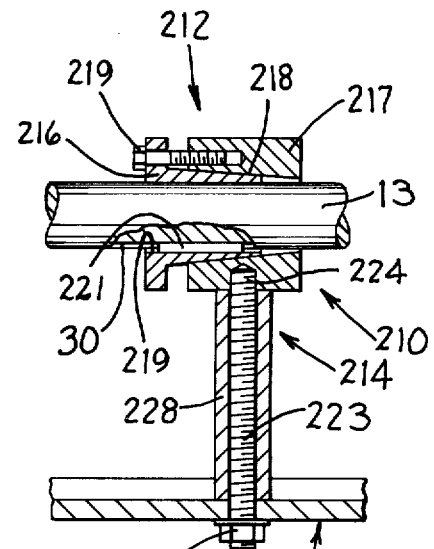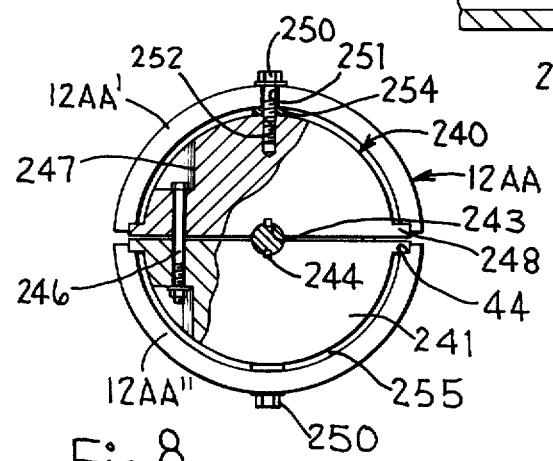

BRUSH CONSTRUCTION

FIELD OF THE INVENTION

This invention relates to a rotary brush construction and more particularly relates to a rotary top brush for vehicle washing.

BACKGROUND OF THE INVENTION

Rotary top brushes have been used for some time in mechanized vehicle wash systems. Typically, such a rotary top brush is mounted on a horizontal shaft and spans substantially the width of the vehicle. Relative vertical and longitudinal movement between the top brush shaft and vehicle enables the top brush to move over the grill, hood, windshield, top and trunk of the vehicle for cleaning same.

A primary difficulty encountered in prior rotary top brushes has been lack of adequate bristle lubrication, that is, lubrication of the entire length of the bristle strands, from mounted end to free end. The term lubricating liquid refers, for example, to water containing soap or detergent or water alone.

Among the problems resulting from improper bristle lubrication are the following. Without proper lubrication, the bristles drag rather than slide over the surface of the vehicle, thereby tending to wrap around, or become jammed under, trim and accessories. Thus, trim and accessories such as mirrors, bright metal trim strips and the like are readily damaged or ripped off the vehicle by the bristles.

Further, certain accessory parts, notably aerials, which penetrate a substantial distance into the bristled portion of the brush, tend to be entangled or enwrapped by the relatively long flexible bristles. Improperly lubricated bristles will not readily release and may damage or break off the aerial. Still further, surfaces of the vehicle will be repeatedly contacted during the washing by rapidly moving bristles, and inadequately lubricated bristles tend to damage the finish of the vehicle. More particularly, the surface of the vehicle is frequently marked or hazed by deposits thereon of a wax-like film (e.g. polyolifin) from the brush bristles or may be actually scratched by bristles which have picked up dirt particles or road film and are continually slapping or rubbing against the car finish at high speeds.

Moreover, improper lubrication increases bristle wear and decreases bristle life. Additionally, improper bristle lubrication causes the brush to clean less well. Other disadvantages of improper lubrication exist but are not believed to require discussion.

Attempts to supply liquid lubricant to brushes of this kind by spraying from an external nozzle onto the periphery of the rotating brush have not been satisfactory. The rotating brush bristles tend to bat away, or throw off, the lubricant so applied. This is especially true when brush rotational rate and/or diameter is sufficient to create high bristle tip speed, as is normally the case for a top brush in car wash systems. The result is that the lubricant does not penetrate the brush, being present at best merely on the exposed bristle tips and leaving the major bristle length substantially unlubricated. Attempts to increase the flow rate of liquid lubricant to the brush have been ineffective and, indeed have increased cost through use of more lubricant.

Thus, while rotating top brushes have been known for some time in vehicle washing systems, the above mentioned difficulties have been sufficient to cause some car wash owners not to use their top brush at all, even in the face of higher labor costs. Attempts to utilize a nonrotating top cleaning device, such as a nonrotatable brush or piece of carpet fabric which is dragged over the surface of the vehicle, have generally provided unsatisfactory cleaning.

A prior attempt to provide lubricant to a rotatable top brush by means of a hollow top brush shaft was unsuccessful in that liquid could not be provided with sufficient uniformity or in sufficient amount for satisfactory brush lubrication.

The problem of rotary top brush lubrication is complicated by such characteristics as substantial brush size (a 5 foot diameter and 6 foot length being common), need for relatively small core diameter, and high bristle tip speeds. Further compounding the problems are restrictions on noise generated by drying blowers utilized in such vehicle washing systems as a result of Occupational Health and Safety Administration rules. Such restrictions have resulted in reduced dryer-blower speeds and hence have forced use of higher heat settings for dryer heating elements. This excessively heats and dries the bristles of the adjacent top brush and further increases the need for effective lubrication of the top brush.

Accordingly, the objects and purposes of this invention include provision of:

1. A rotary brush construction particularly for vehicle washing in which the bristles are lubricated along the lengths thereof from point of attachment to the rotary brush core to the free ends, or tips, thereof.

2. A brush construction, as aforesaid, wherein proper lubrication is maintained despite substantial overall brush diameter, substantial brush length and relatively high bristle tip speeds.

3. A brush construction, as aforesaid, capable of satisfactory cleaning of vehicle surfaces without marking, hazing or scratching thereof, and particularly wherein the brush bristles do not tend to pick up dirt particles or road film or scratch the vehicle finish therewith or deposit a waxlike film thereon.

4. A brush construction, as aforesaid, wherein bristle drag on vehicle surfaces is substantially reduced and wherein the bristles tend to slide easily over vehicle surfaces encountered thereby.

5. A brush construction, as aforesaid, wherein brush bristles no longer tend to wrap around or jam under vehicle accessories such as mirrors, chrome strips and the like and wherein the brush bristles no longer tend to damage or rip off projecting accessories on the vehicle.

6. A brush construction, as aforesaid, in which entanglement of brush bristles with, and damage to, aerials or the like is substantially reduced despite deep penetration of such aerials or the like into the bristle field of the brush.

7. A brush construction, as aforesaid, in which effective cleaning is acheived with moderate amounts of liquid lubricant and wherein shortening of brush life due to premature bristle wear is avoided.

8. A brush construction, as aforesaid, in which effective lubrication of the bristles is provided even under conditions of high heat and wherein centrifugal force generated by brush rotation is utilized to aid distribution of liquid lubricant along the length of the bristles from root to tip and so as to provide a constant flushing of the bristles.

9. A brush construction, as aforesaid, which is of relatively simple construction and is readily manufacturable from available materials and at costs generally comparable to existing top brushes.

10. A brush construction, as aforesaid, enabling rapid and simple replacement of worn portions of the brush construction without disturbing securement of remaining portions of the brush construction on the brush shaft and wherein different length sections of the brush construction may be provided with differing and readily variable bristle densities.

SUMMARY OF THE INVENTION

The objects and purposes of the invention, including those set forth above, have been met by providing a rotary brush construction, particularly for a top brush for washing vehicles including elongate bristles carried on a perforate hollow cylindrical core of relatively small diameter. A plurality of axially short collar units secure the core on a shaft for rotation therewith and are spaced along the inside of the core. The collars each comprise a hub fixed to the shaft. Tension members extend from the hub and hold the core. A shell carried by radial web members, or a set of spacers, space the core from the hub. At least the outer collars occupy minimal cross-sectional area within the core. Lubricant liquid streams enter the opposite core ends and pass inward through the collars for distribution of liquid within the core. The liquid passes out through the core perforations to lubricate the bristles. The core preferably comprises plural longitudinal sections having differing bristle densities. The core and collar are preferably circumferentially segmented.

Other objects and purposes of the invention will be apparent to persons familiar with rotary brush constructions upon reading the following description and examining the accompanying drawings.

BRIEF DESCRIPTION OF THE DRAWINGS

FIG. 5 is an enlarged, modified fragment of FIG. 1.

FIG. 6 is an enlarged, partially broken sectional view taken on the line VI—VI of FIG. 5.

FIG. 7 is an enlarged, partially broken, fragmentary sectional view taken on the line VII—VII of FIG. 6.

FIG. 8 is an enlarged partially broken sectional view taken on the line VIII—VIII of FIG. 5.

Figure 1:
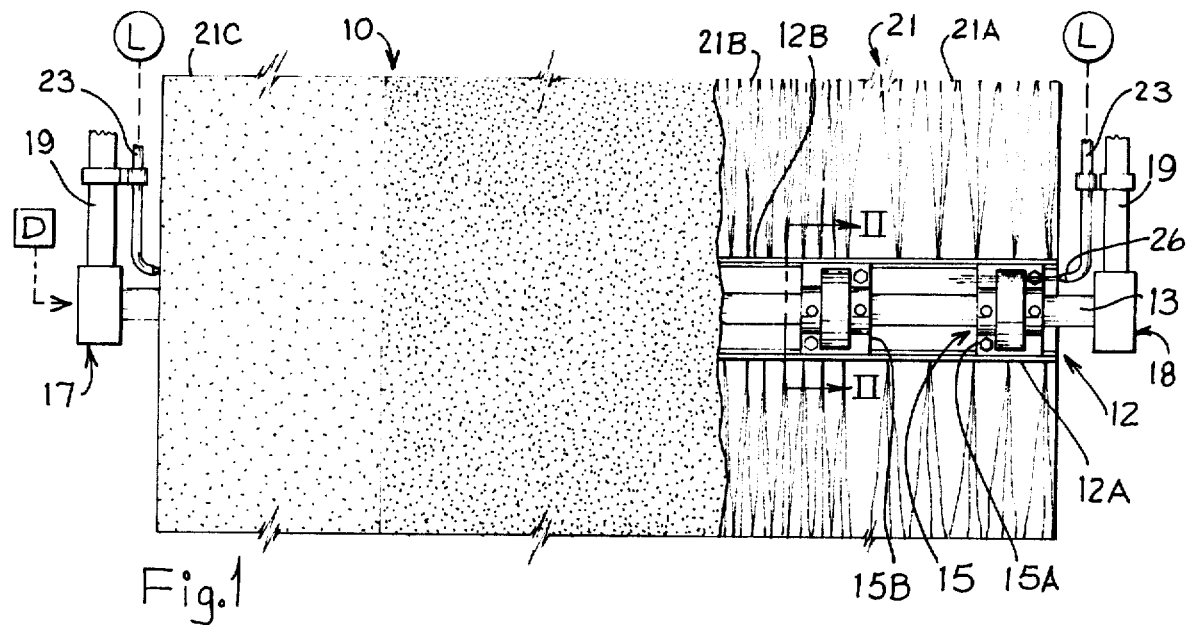
FIG. 1 is a fragmentary partially broken side elevation of a rotary top brush embodying this invention.

For convenience in the following description, the terms "inner," "outer" and words of similar import will refer to the central axis of, and designated parts of, the brush construction. DETAILED DESCRIPTION The brush construction 10 (FIG. 1) embodying the invention comprises a hollow cylindrical core 12 coaxially fixed on a rotatable shaft 13 by radially intervening collars 15. The rotatable shaft 13 extends length wise through the core 12 and has ends extending therebeyond and supported by conventional bearing and drive members 17 and 18 adjacent the ends of the core 12. The bearing and drive members 17 and 18 are preferably supported conventionally by pivoted arms 19 on the framework (not shown) of a conventional car wash system, so that the brush construction 10 can be moved vertically and horizontally in response to movement of the arms 19 and longitudinal traversing movement of the aforementioned framework with respect to a vehicle, in the manner of known rotary top brushes, for cleaning the bumpers, grill, hood, top, rear, etc. of a vehicle. The shaft 13 is rotatably drivable in any desired manner, such as through a chain-drive contained in an arm 19, suitable rotational drive means being schematically indicated at D.

Thus, the present invention contemplates the top brush construction utilizing a shaft 13 of substantially conventional diameter and mounting to facilitate use of the inventive brush construction 10 as a direct replacement, in existing bearing and drive members 17 and 18, for an existing rotary top brush.

Figure 2:
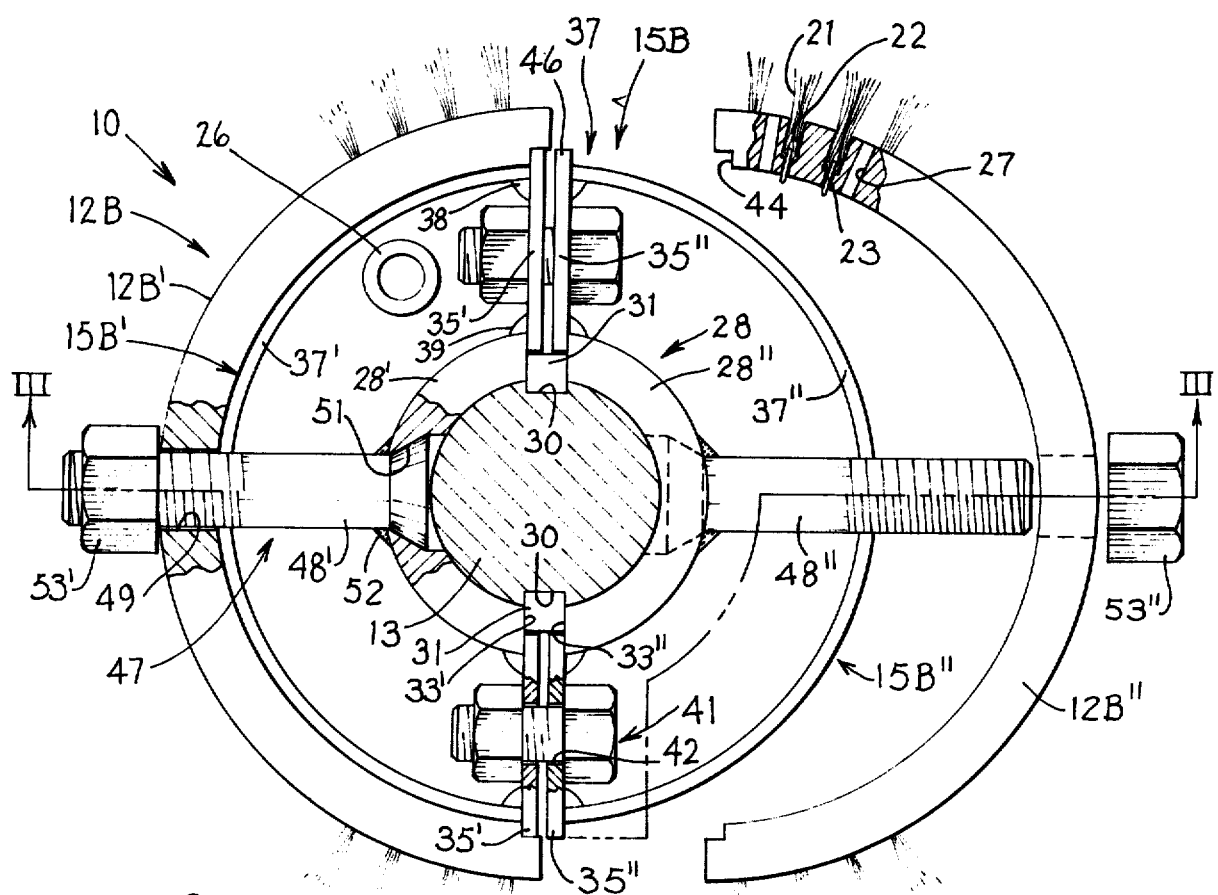
FIG. 2 is a fragmentary, partially broken, enlarged and partially exploded sectional view substantially as taken on the line II—II of FIG. 1.

Flexible bristles 21 are fixed to, and are distributed over the outer surface of the core 12. The bristles extend substantially radially from the core, and in use form the substantially cylindrical arrangement, the bristle tips and adjacent bristle end portions thus being adapted to engage opposed surfaces of a vehicle. The brushes may be secured to the core in any conventional manner. For example, as seen in FIG. 2, the bristles may be arranged in tufts received in stepped openings 22 through the core wall and secured at their inner ends by wires 23 or other convenient means. However, a variety of methods and structures can be employed to secure the bristles to the core 12, further examples being shown in my prior U.S. Pat. Nos. 3,529,314 and 3,594,842. Rotary top brushes are required to be long enough to span the width of the vehicle to be cleaned, for example six feet in length. I have gound it desirable to provide a top brush of relatively large overall diameter, for example five feet, with the bristles occupying the major diametral portion of the brush and the diameter of the core minimized. The latter reduces core circumference and hence the number of bristle tufts required, thereby reducing cost of construction. Moreover, interference between the core and projecting accessories on the vehicle (such as antennas and the like) is reduced or eliminated.

Thus, in the preferred embodiment shown, the core is of about five to six inch diameter. Brush and core diameters thus differ by about an order of magnitude or more. Diameters in the range of about three to nine inches being contemplated. The brush construction 10 thus is characterized by an elongate slim core.

The core 12 is preferably provided as a plurality of longitudinally extending, end adjacent sections separately installable on the shaft 13. Two such sections are indicated at 12A and 12B in FIG. 1. Such allows more compact storage and shipment of the core, as well as replacement of the core one section at a time in the event of damage or excessive bristle wear in a portion of the brush construction. Further, in the preferred top brush shown, different core sections are provided with differing bristle densities. More particularly, the relatively short end sections (e.g. 12A) carry fewer bristles per unit length, as indicated at 21A and 21C, than does the longer central section 12B, the more densely arranged bristles of which are indicated at 21B. Vehicle accessories such as aerials, external rearview mirrors, and so forth are normally contacted by the end portions of the top brush. The less bristle density in the end sections of the brush 10 reduces any tendency for bristles to become entangled with or "hung-up" on such accessories, particularly should the top brush to be operated is without lubrication.

Where the brush construction is longitudinally sectioned as above-discussed, individual collars 15 are provided adjacent the ends of the end sections, as at 15A in end section 12A. Intermediate collars are located where the ends of adjacent core sections meet, as at 15B in FIG. 1. If desired, one or more additional intermediate collars (not shown) may be spaced intermediate the ends of very long core sections, such as intermediate core section 12B. However, such normally will not be required in the contemplated range of section lengths and with a core of sufficient strength as to minimize lateral flexing.

The preferred embodiment shown in FIG. 1 provides full length bristle lubrication. More particularly, suitable lubricant liquid, such as water, with or without soap or detergent, etc., is fed from a conventional pressurized source L through conduits 23 extending adjacent the ends of the brush construction 10 and terminating in nozzles, as at 26. The nozzles 26 are aimed longitudinally of the core 12, are disposed radially between the inner wall of the core and the shaft 13 and preferably enter at least slightly into the ends of the core for aiming streams of liquid into and longitudinally of the core toward the center thereof.

A plurality of lubricant openings 27 (FIG. 2) extend through the wall of the core 12. The openings 27 are close-spaced and substantially uniformly distributed over the core adjacent the bristles 21. Lubricant liquid forced from the nozzles 26 into the core thus passes outwardly through the core openings 27 and along the bristles 21, providing full length lubrication of all the bristles of the brush. Additional bristle lubrication may be provided directly to the inner ends of bristle tufts where seated in openings 22, as in FIG. 2.

It is contemplated, within the broader aspects of the invention, that circumferentially unitary core sections and collars may be employed. However, the preferred embodiment of the invention shown incorporates circumferentially segmented core sections and collars. Such permits, for example, replacement of collars, and particularly of core sections, without distrubing the location of the shaft 13 in the bearing and drive members 17 and 18.

Circumferential segmentation of the core sections and collars is preferably along a single diametral plane of the shaft 13. Such is illustrated by the core section 12B and collar 15B in FIGS. 2 and 3, the remaining core sections and collars of the brush construction 10 preferably being similar. The core section 12B thus comprises an opposed, preferably identical, closely adjacent pair of semi-cylindrical core segments 12B' and 12B''. Similarly, the collar 15B shown in FIG. 2 preferably comprises a pair of opposed and preferably identical semi-circular collar segments 15B' and 15B''.

In more detail the collar 15B (FIGS. 2 and 3) comprises an axially extending hub 28 snugly surrounding the shaft 13 and here formed as a diametrally opposed pair of semi-cylindrical segments 28' and 28''. Keyways 20, here diametrally opposed, extend longitudinally in the shaft 13 and receive elongate keys 31 at the location of the collar 15B. The keys 31 extend radially from the shaft a distance less than the thickness of the hub 28 and are sandwiched circumferentially between opposed ends 33' and 33'' of the hub segments 28' and 28'', respectively.

Preferably platelike web members 35' and 35'' extend substantially radially from the hub 28 and substantially the length of the hub 28.

Figure 3:
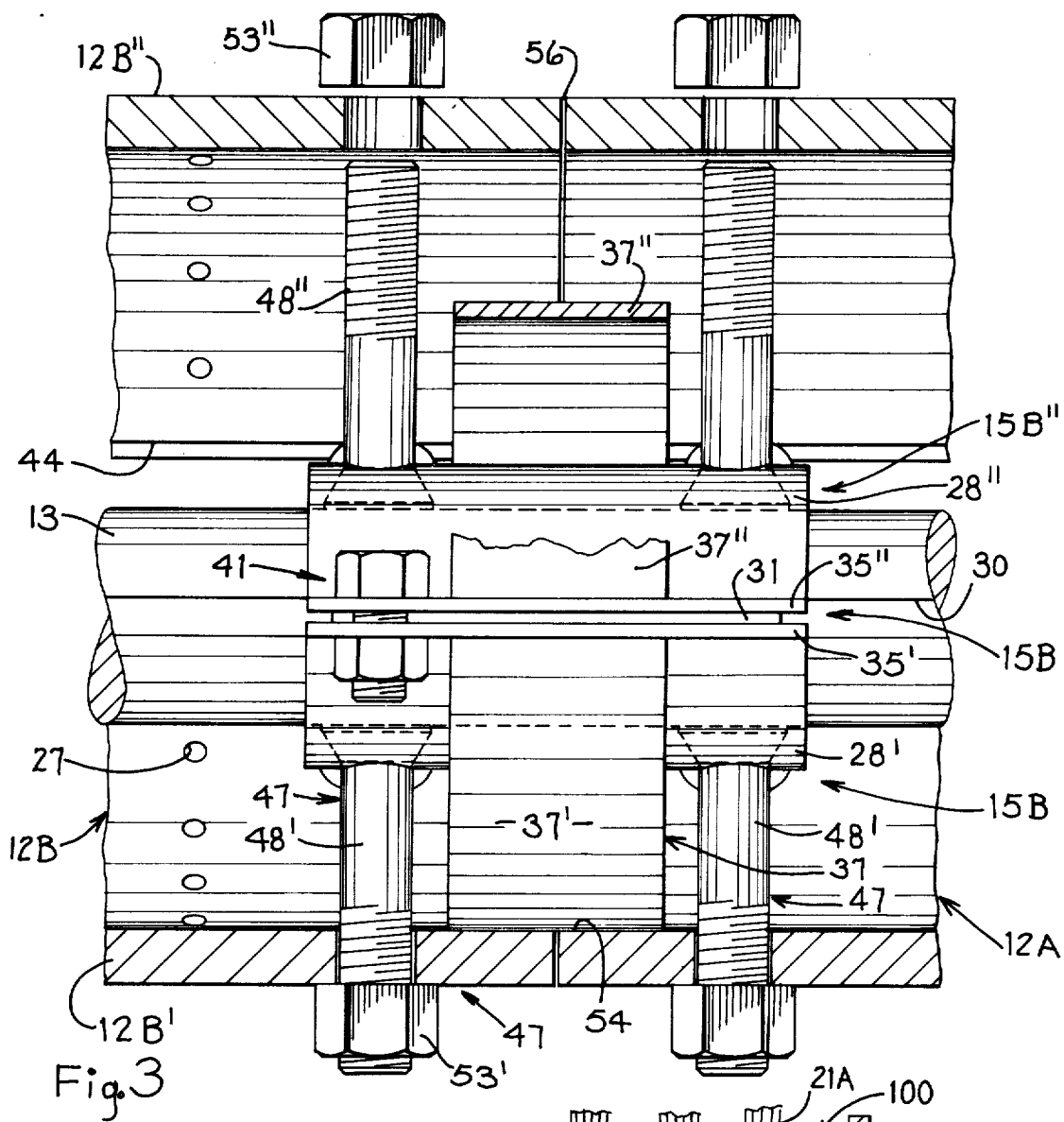
FIG. 3 is a fragmentary sectional view substantially taken on the line III—III of FIG. 2.

A thin walled cylindrical shell 37 is fixedly carried by the web members 35' and 35'' adjacent their radially outer edges. The shell 37 coaxially surrounds and is radially spaced from the hub 28. In the assembled brush construction, the shell radially contacts and supports the core 12 coaxially of the shaft 13. The shell 37 is substantially shorter than the web members 35' and 35'' and hub 28 and is preferably axially centered thereon, as seen in FIG. 3. A benefit of such a short shell is minimized blockage thereby of core perforations 27.

In diametrally segmented embodiment of FIGS. 2 and 3, the shell 37 comprises a pair of diametrally opposed, semicylindrical segments 37' and 37'' radially aligned with corresponding hub segments 28' and 28''.

Considering the collar segment 15B', for example, the substantially diametrally spaced and coplanar pair of web members 35' thereof extend between corresponding circumferential ends of the hub segment 28' and corresponnding circumferential ends of the shell segment 37'. The inner edges of the web members 35' radially overlap the corresponding hub segment ends and closely overlie the corresponding keys 31, preventing key dislodgement by centrifugal force during brush rotation. The outer edges of the web members 35' extend radially beyond the ends of the shell segment 37' a distance less than the thickness of the core 12 for purposes apparent hereinafter. The web members 35' are fixed to corresponding hub segment 28' and shell segment 37', preferably by welds 38 and 39 within the confines of the collar segment 15B'. The collar segment 15B'' is preferably identically constructed.

The collar segments 15B' and 15B'' are removably secured in opposed relation on the shaft 13, preferably by nut and bolt sets 41 which extend through aligned openings 42 in the opposed web members 35' and 35''. Preferably, the opposed web members 35' and 35'' remain slightly spaced upon tightening of the nut and bolt units 41, so that the hub 28 snugly grips the shaft 13 and the hub segment ends contact, or lie close to, the keys 31 to prevent relative rotation between the hub and shaft.

In the particular embodiment shown, two of the nut and bolt units 41 are provided on each collar 15, being diagonally located adjacent opposite axial ends of the collar. However, it is contemplated that a further pair of nut and bolt units (not shown) may be provided in each collar, at the remaining pair of web member corners, for symetrical and stronger securement of the collar segments. The nut and bolt sets lie axially outboard of the shell 37 and are readily accessible without interference by the shell.

Notches 44 extend along the inner axial edges of the core segments 12B' and 12B''. The notches 44 receive the outer edges 46 of the web members 35' and 35'' with the inner surface of the corresponding collar segments lying on the outer surface of the corresponding shell segments, as shown in the left half of FIG. 2. In this way, circumferential shifting of a core segment 12B' on its correspondinng shell segment 37' is positively precluded by interference between the notched core segment ends and the outer web member ends 46. The opposed edges of the core segments 12B' and 12B'', when installed on the shell 37, are close-spaced and substantially abut.

Tension units 47 (FIGS. 2 and 3) radially secure the core segments 12B' and 12B" to the collar 15B. The tension units 47 preferably comprise screws 48' and 48" fixed to and extending from respective hub segments 28' and 28" radially outwardly past the axial ends of the corresponding shell segments 37' and 37" and snugly through openings 49 in the corresponding core segments.

Considering the collar segment 15B' for example, the screw 48' is here provided with a substantially conical head, and may be a conventional flat head machine screw. An outwardly directed, countersunk opening 51 in the hub segment 28' receives the head of the screw 48', outboard of the shaft 13. The screw 48' is preferably welded to the hub segment 28', as at 52. Nuts 53' and 53" threaded on the outer ends of the screw 48' and 48" secure the core segments 12B' and 12B" snugly against the outer surface of the shell segments 37' and 37".

As seen in FIG. 3, a pair of such screws 48' and 48" are preferably provided on each of the collar segments 15B' and 15", adjacent the ends of the corresponding hub segments and substantially in circumferential alignment with the nut and bolt units 41.

As in the case of the collar 15A, a collar 15 may be utilized solely to secure a single core segment on the shaft 13. However, as in the case of collar 15B, a collar 15 can additionally axially secure together two adjacent core sections such as sections 12A and 12B as seen in FIG. 3. In the latter instance, the tension units 47 at opposite ends of the collar 15B engage the corresponding end portions of the adjacent core sections 12A and 12B, preventing axial separation thereof. Further, the centrally located shell 37 of such collar 15B overlaps the two adjacent ends of the core segments 12A and 12B and bears against the inner surfaces thereof, as indicated at 54, to maintain same coaxially. Also, the shell 37 spans and closes any axial space 56 between the adjacent ends of the core sections 12A and 12B.

In the preferred embodiment shown, the pairs of tension units 47 of each collar segment preferably parallel the axes of the nut and bolt units 41 and are spaced equally and substantially at 90° angles from the connection of the web members 35' and 35" to the corresponding hub segment. Thus, in the preferred embodiment shown, the screws 48' and 48" are preferably substantially diametrically aligned and circumferentially centered on the core segments, so as to pull the core segments diametrally toward each other.

OPERATION

The brush 10 can be assembled with the shaft 13 mounted on the bearing and drive members 17 and 18, or if desired, prior to such mounting. Assembly of each longitudingal core segment is similar and a description of one will suffice for all, except as otherwise noted. The core segments can be applied to the shaft in any desired order.

For example then the intermediate core segment 12B can be applied to the shaft in the following manner. With the keys 31 located in the keyways 30 at the axial location of the collar 15B on the shaft, the collar segments 15B and 15B' are applied to the shaft simultaneously or sequentially as desired. The nut and bolt units 41 are then applied to the opposed pairs of web members 35' and 35" and tightened to cause the hub sections 28' and 28" to snugly grip the shaft 13, preventing unintended eccentric or axial relative movement between the shaft and hub. The web members 35' and 35" also maintain the keys 31 against radial movement out of their keyways 30, the keys 31 preventing unintended relative circumferential movement between the shaft and hub. In this manner, the collars 15 for one or all of the core sections 12 can be applied to the shaft at the desired axial locations therealong.

Thereafter, the core segments for each brush section are applied to the outer surfaces of the shells 37 of their corresponding collars 15. For example, the core segment 12B' is moved radially toward the collar segment 15B' until the openings 49 receive the free ends of the screws 48' therethrough and the circumferential end notches 44 of the core segment receive the ends 46 of the corresponding web members therein, whereby the outer surface of the shell segment 37 backs and supports the inner surface of the core segment 12B. The lock nut 53' is then applied and tightened on the free end of the screw 48' to firmly fix the core segment 12B' against radial and axial movement with respect to the collar 15B. Contact between the notches 44 and the adjacent outer edges 46 of the corresponding web members 35' prevents, or assisting the screw 48' in preventing, circumferential dislocation of the core section 12B' on the collar 15B. The core segment 12B" is similarly applied to the collar 15B. The bristles on each core segment are arranged so as not to interfere with application of the lock nuts 53' or 53".

In this manner, the core segments can be applied to their corresponding collars, whether such collars extend beyond ends of the core section as in the case of core section 12B and collar 15B, or whether a given collar is located intermediate the ends of a given core section as in the case of collar 15A and core section 12A.

By the same token, a given intermediate collar, such as collar 15B, supports adjacent end portions of two core sections and axially ties same together.

For repair or replacement, as due to bristle damage or wear, a given core section, and associated collars if desired, can be removed from the shaft 13, without removal of remaining core sections and collars from the shaft and without removal of the shaft from the bearing and drive members 17 and 18. Similarly, individual semi-circular core segments can be removed from the remainder of the brush construction, simply by releasing the locking nuts 53' or 53" thereof.

In operation, and normally when a vehicle is positioned to be washed, the top brush 10 is rotated at conventional speeds, for example with bristle tip speeds in the region of 15 to 25 mph, through the conventional rotational drive D for the shaft 13. Rotational torque is transmitted from shaft 13 through keys 31 and thence through hub 28 and web members 35' and 35" to the core segments 12B' and 12B" in a positive manner.

Lubricant liquid, such as soapy water, is applied from the source L through conduits 23 and flows as a stream from each of the opposed nozzles 26 at the ends of the brush core 12, longitudinally into the open ends of the brush core 12. Conventional city water pressure has been found sufficient.

The nozzles 26 are preferably located near the periphery of the core, radially inboard of the relatively thin shells 37 of the collars 15, but spaced outboard of the shaft 13 and collar hubs 28.

Liquid preferably enters the end of the core from each nozzle 26 as a solid, narrow stream at relatively high velocity and directed longitudinally of the core. The radially extending web members 35' and 35'' and tension units 48' and 48'' of the collars 15 periodically and momentarily strike and pass through the adjacent stream during brush rotation. A segment of the stream so struck and removed from the stream is thus broken up and splattered substantially in all directions within the core to provide a relatively uniform distribution of liquid on the interior core surface adjacent and between successive collars 15. The remainder of the stream continues inward along the core and further segments are struck and splattered by the radially extending parts of successively encountered collars 15.

The opposed streams from the opposite ends of the brush 10 tend to diverge in passing inwardly along the core 12. Portions of a stream reaching the central portion of the core, either by divergence or collision with portions of the opposed stream from the other end of the core, contact and are spread over the core interior wall. Any remaining portions of a given stream moving beyond the center of the core tend to be struck and splattered by radial portions of further collars 15. In this way, a relatively uniform distribution of liquid is achieved throughout the length and the circumference of the core 12.

Centrifugal force, due to rotation of the brush construction 10, forces such liquid through the plural openings 27 our of the core 12 and outwardly along the length of the bristles 21 to the tips thereof, providing full length lubrication of such bristles.

The collars 15 contact the interior of the core only over a minimum longitudinal area thereof and thus do not substantially interfere with provision of lubricant outlet perforations in the core. Moreover, the collars 23 occupy a minimal cross-sectional area between the shaft and core, so as to provide minimal interference with liquid flow from the nozzles 26 longitudinally into and along the core to the center thereof. In this manner, a substantially uniform supply of liquid lubricant is provided throughout the area of the core and to the bristles of the brush as a whole.

More particularly, in the embodiment shown, each collar 15 occupies only about 40 percent of the cross-sectional area between the shaft and the interior face of the core. More to the point, the cross-sectional area available to the stream through each collar 15, is that annular area between the radially opposed surfaces of the hub 28 and the shell 37. In the embodiment shown, the last mentioned area is at least about 75 percent unoccupied by radial structure, namely by the platelike web members 35' and 35'', the nut and bolt units 41, and the tension units 48' and 48''. Further, whereas the web members 35', 35'' here extend the full length of the collar 15, the nut and bolt units 41 and tension units 47 extend axially only a relatively small fraction of this length. Thus, considering a full rotation of the shaft, ample opportunity is provided for substantial portions of the stream to pass through successive collars 15 toward the center of the brush construction. Further, the differing shapes of these radially extending collar portions tend to provide somewhat differing water splatter patterns. Thus again, a relatively uniform distribution of lubricant liquid can be achieved throughout the interior of the core, providing adequate lubrication of the bristles of the brush construction.

Although a minor portion of an incoming stream may be deflected axially back out of the core, by contact with the adjacent outermost collar 15, the substantial majority of the stream continues into the core. The amount of liquid which may be deflected back out of the core in this manner is negligible and creates no problem in brush lubrication or in the car wash system environment since in use the latter is normally filled with liquid droplets and mist. Although such has not been found necessary, a suitable radial end baffle (not shown) may, if desired, cover the open end of the core 12 coaxially of the shaft 13, the nozzle 26 entering therethrough into the core, so as to reduce even this minimal back splash from the core. Such a baffle may be fixedly mounted, for example, on the corresponding bearing and drive member 17 or 18.

Though it has not been found necessary to proper operation, it is contemplated that several nozzles 26, for example supplied through several conduits 23, may be provided at each end of the brush construction.

The top brush 10 embodying the invention can be moved by the arms 19 in a conventional manner over the usual surfaces of a vehicle to be cleaned by a top brush, normally the front bumper, grill, hood, windshield, top, rear window and rear deck and bumper of the vehicle.

Any tendency of brush bristles to entangle with and damage, or be damaged by, vehicle surfaces or projecting accessories is substantially eliminated by the provision of proper lubrication to the brush bristles, adequate lubrication being provided even under highly adverse conditions, such as high blower heat. Any tendency to entangle with accessories (such as high mounted side metal trim strips, exterior rear vision mirror, antennas and so forth), which are normally adjacent the side portions of the vehicle, is further reduced by the reduced number and density of bristles 21A and 21C in the corresponding end core sections 12A and 12C of the brush in cleaning contact therewith.

The present invention permits satisfactory lubrication of a long, large diameter brush, even with a relatively small diameter core. Small core diameter is in a top brush to reduce the number of bristles required for satisfactory performance (thereby reducing material cost for the bristles, core and supporting collars and labor cost) and to prevent unintended contact with projecting vehicle accessories (primarily radio aerials) by substantially spacing the brush core from the vehicle surface without loss of adequate bristle contact for satisfactory cleaning. In the embodiment disclosed, the core diameter of about four or five inches provides adequate bristle lubrication despite the substantial bristle length and core length to diameter ratio resulting from brush diameter and length dimensions of, for example, five and six feet, respectively.

MODIFICATION

Figure 4:
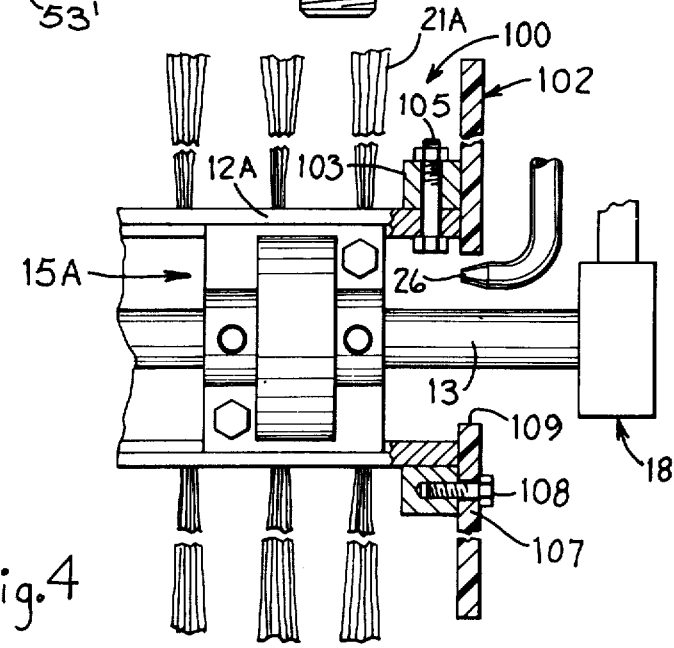
FIG. 4 is an enlarged, modified fragment of FIG. 1.

FIG. 4 discloses a modified brush construction generally indicated at 100 and which is preferably similar to the above described brush construction 10 except as follows.

At each end of the brush construction 100 (one end being shown in FIG. 4) there is provided a disc assembly 102. The disc assembly 102 comprises a ring 103 snugly encircling the outboard end of the core 12A and secured thereto by a plurality of circumferentially spaced removable fastening elements, here nut and bolt sets 105. In the particular embodiment shown, the ring 103 was formed of an axial segment of standard diameter tubing cut through at one point on the circumference thereof and resiliently deformed outwardly to slip over the core end snugly. A disc 107 coaxially end abuts the ring 103 and the free end of the core 12A and is removably secured, as by a plurality of circumferentially spaced screws 108 to the ring 103, and thus to the end of the brush construction 100. A central opening 109 in the disc 107 is of sufficient size to allow, without interference, an input of soapy water or the like from lubrication nozzle 26. The outer diameter of the annular disc 107 is intermediate the diameters of the core 12A and the set of bristles 21A, a disc diameter of about 18 inches being typical for a 5 inch diameter core and a 5 foot bristle outer diameter. The disc is preferably of plastic. The disc 107 thus rigidly secured to the adjacent brush end prevents the flexible bristles 21A from becoming entangled with adjacent structure such as the bearing and drive member 18, which supports shaft 13, and other adjacent equipment.

FIGS. 5-8 disclose a further modified brush construction 200, preferably similar to the above described constructions except as follows.

The brush construction 200 is simplified in its collar construction and less expensive to manufacture, as compared to the FIG. 1 embodiment. While some liquid lubricant reaches the central portion of the brush construction 200, primary attention is given to distribution of liquid lubricant in the endmost core sections since these engage the vehicle accessories, such as finder mounted radio antennas and side mounted rear view mirrors, most likely to become entangled with brush bristles.

At least the endmost collars (one being shown at 210 in the right endmost core section 12AA of FIG. 5) of the brush construction are axially open to a high degree for permitting the majority of liquid lubricant from nozzle 26 to flow therepast into the interior of corresponding endmost core section. Collar 210 includes a hub 212. Core carriers 214 radially outwardly extend from the hub 212 in circumferentially evenly spaced relation for radially spacing the core 12AA from the hub 212. Four core carriers 214 located at 90 degree intervals are here provided.

The hub 212 is preferably a conventional taper lock hub assembly.

The particular hub 212 shown in FIG. 7 comprises tapered inner and outer annular members 216 and 217 engaging in a conically tapered zone generally indicated at 218. Screws 219 secure member 216 to member 217. The inner member 216 may be slotted at its rightward (FIG. 7) end so that tightening of the screws 219 will cause the same to snugly grip the shaft 13, preventing unintended axial shifting of hub 212 on the shaft 13. Coacting keyways 30 and 219 in the shaft and inner tapered member 216, respectively, receive a key 221 to lock the hub circumferentially on the shaft 13.

Each core carrier 214 here comprises an inner tension member 223 threaded in the outer hub member 217, as at 224, and extending radially outwardly through the core 12A through a suitable opening, as at 226 or 227. Corresponding cylindrical spacers 228, 229 snugly surround the tension members, the ends of such spacers abutting the periphery of the hub member 217 and the inner surface of the core 12AA, respectively, for coaxially locating the core with respect to the hub 212 and shaft 13. As in FIG. 1, the core 12AA is split diametrally into opposed half cylinders 12AA' and 12AA'' the length edges of which are notched at 44. The spacers 229 centrally abut the inner peripheral wall of the core. However, the spacers 228 have outer ends received in the opposed edge notches 44 of the core halves 12AA' and 12AA'' and the adjacent openings 226 for the threaded tension members 223 are provided as circumferentially opening grooves in such opposed core half edges. Washers 230 and nuts 231 on the ends of the threaded tension members 223 snugly hold the core halves 12AA' and 12AA'' around the hub 212.

While ones of the remaining, inner collars, may be similar to outer end collar 212, in the embodiment shown the inner collars are preferably similar to the collar 240 (FIGS. 5 and 8) at the inner end of the end core section 12AA. Collar 240 comprises a pair of diametrally opposed and substantially semi-circular, platelike members 241. Opposed central semi-circular openings in the members 241 define the central shaft opening 243 of the collar 240. The platelike members 241 are clamped in close spaced opposition on the shaft 13 by chordal nut and bolt sets 246 on opposite sides of the shaft. Peripheral recesses 247 on the collar members receive the bolt heads and nuts of the sets 246. Keys 244 positively circumferentially locate the collar members 241 on the shaft 13.

Flat tabs 248 extend substantially diametrally from each collar member 241 for paired, snug reception in the opposed edge notches 44 of the core segments 12AA' and 12AA'' for positively circumferentially locating the core segments 12AA' and 12AA'' on the collar 240. Threaded tension members, here screws 250, are circumferentially centered on the collar members 241 and corresponding core segments 12AA' and 12AA'', and extend through openings 251 in the core segments and threadedly engage radial openings 252 in the collar members. The outside diameter of the collar 240 is somewhat less than the inside diameter of the core 12AA to define a pair of semi-annular spaces 255 therebetween through which a portion of the lubricant liquid from nozzle 26 can flow toward the center of the brush construction 200. Radially short spacers 254 on the screws 250 are interposed between the core and collar to maintain the spacing 255.

Whereas the outer collar 210 here requires removal of the shaft 13 from its bearing 18 for installation thereon, the inner collars 240 do not. Where desired, the taper lock hub 212 may be replaced by a hub not requiring such removal of shaft 13, e.g. a diametrally split hub. The core segments 12AA' and 12AA'' of core section 12AA are readily installable and removable on the collars simply by corresponding insertion and removal of the four nuts 231 of each collar 210 and screw pair 250 of each collar 240.

By providing a substantially open collar 210 at the outer end of the end core section 12AA and a substantially solid collar 240 spaced inboard thereof, as at the inner end of such core section, the majority of liquid lubricant supplied by nozzle 26 can be distributed to and lubricate the bristles 21A near the end of the brush core where the need for bristle lubrication is most critical, to avoid bristle entanglement with vehicle fender mounted antennas and side mirrors. Some of the liquid lubricant axially passes the peripheries of the one or several adjacent solid collars 240 toward the center of the brush construction to provide sufficient lubrication of central bristles as to avoid marking of vehicle surfaces thereby.

If desired, the core edge notches may be omitted, as the assembly has been found to be of ample strength without same, and the spacers 228 and/or tabs 248 correspondingly reduced in length to bear on the inner surface of the core 122A.

Although a particular preferred embodiment of the invention has been disclosed in detail for illustrative purposes, it will be recognized that variations and modifications of the disclosed apparatus, including the rearrangement of parts, lie within the scope of the present invention.

The embodiments of the invention in which an exclusive property or privelege is claimed are defined as follows:

1. A rotary brush construction, particularly for top washing of vehicles, and adapted for mounting on a rotary shaft, comprising:
   a hollow cylindrical perforate core means mounting brush bristles thereon and adapted to loosely receive the shaft therethrough;
   at least a pair of split annular means spaced axially from each other within the core means for securing the core means to the shaft, each said annular means being mounted on the shaft for rotation therewith and having a substantially cylindrical outer surface means spaced radially from the shaft for backing the core, substantially radially extending portions associated with the annular means for circumferentially positioning the core means relative to an annular means, and tension means for pressing the core means against the annular means;
   said annular means comprising a collar having a hub mounted on the shaft for rotation therewith and a cylindrical shell spaced radially from the hub for backing the core means, said cylindrical shell defining thereon said outer surface means, said radially extending protions comprising web members extending radially between the shell and the hub for fixing the shell to the hub;
   said tension means extending radially from said hub past said shell and through said core, said hub, shell and core being circumferentially segmented, each corresponding hub segment, shell segment and core segment being of substantially similar circumferential extent, there being a one said tension means extending in circumferentially intermediate location from such hub segment past the corresponding shell segment and through the corresponding core segment to hold the core segment snugly against the shell segment.

2. The apparatus of claim 1 in which the brush construction is substantially open throughout its length radially between the shaft and core, the hub and shell being substantially spaced from each other, the web members and tension means occupying only a minor portion of the cross section of the path axially extending through the brush construction.

3. The apparatus of claim 1 in which said core comprises at least a pair of semi-circular segments secured in cylinder forming relation against said shell by said tension means, said tension means being releasable exteriorly of said core and extending past said shell to said hub so as to also secure the core segments against axial movement with respect to the shells.

4. The apparatus of claim 1 including keys of securing said hub against rotation on the shaft, one such key being interposed between the circumferentially opposed ends of each hub segment pair, each said pair of opposed ends facing and being interconnected to a pair of web members extending radially outward closely from a corresponding key to positively prevent radially outward movement of said key out of circumferential driving engagement with the shaft.

5. The apparatus of claim 1 in which the hub segment is provided with an undercut radial opening circumferentially substantially evenly spaced from the ends of the hub segment, the tension means comprising a radially extending screw having a head located in said undercut opening adjacent the shaft and a shank extending outboard through a coaxial opening in the core segment, said tension means further including a nut on the outer end of the screw for snugly and removably securing the core segment against the shell segment.

6. The apparatus of claim 1 in which the web members extend radially outboard of the corresponding shell segment to a distance less than the thickness of the core, the adjacent circumferential end of the core segment being notched to receive the outboard end of the web member therein so as to circumferentially locate the core segment on the shell segment, the circumferential ends of the adjacent core segments substantially abutting outboard of the web members for substantially closing the core circumferentially.

7. The apparatus of claim 1 in which said wed members are radially and axially extended and circumferentially thin platelike members having the majority of their surface area facing substantially tangentially of the shaft for contacting and splattering the liquid stream periodically during rotation of the shaft, said web members having inner and outer ends radially spaced respectively from the shaft and outer peripheral surface of the core, but circumferentially abutting and partly radially overlapping longitudinally extending edges of circumferentially opposed segments of said hub and core respectively.

8. A rotary top brush construction for washing of vehicles, and adapted for mounting on a rotary shaft, comprising:
   a hollow cylindrical perforate core fixedly mounting brush bristles and adapted to loosely receive said shaft therethrough, said core being diametrally split to provide opposed core halves having opposed longitudinal edge notches which open radially inward and toward each other;
   a plurality of solid substantially planar and diametrally split collar disks spaced axially within the core, each disk half having diametrally extending tabs snugly seated in said notches in the length edges of said core segments, each said disk half having a radially extending spacing element at its periphery against which the opposed core half abuts, portions of the disk periphery between the spacing element and tabs being radially spaced from the inner wall of the core and defining axial through liquid passages;
   diametrally opposed threaded tension means substantially circumferentially centered on said core and disk halves at said spacing elements and extending through mounting openings in said core halves into the opposed peripheral edges of said disk halves for radially fixing the central part of each core half on the corresponding disk half;
   chordal means on opposite sides of said shaft for securing the halves of said disk together with said shaft centrally sandwiched therebetween;
   nozzle means for discharging liquid into an end of said core.

9. The apparatus of claim 8 including fixed bearings rotatably supporting the ends of said shaft, said nozzle means being nozzles fixed adjacent said bearings and directed axially into each end of the core for each directing a stream of liquid lubricant along the interior surface of the core for passage outwardly through the perforations in such core to lubricate the brush bristles and reduce wear of vehicle surfaces thereby.

10. The apparatus of claim 8 including an imperforate annular protective disk fixed to an end of the core, the inner perimeter of said disk being adjacent the core and substantially spaced from said shaft for loose reception of the nozzle therebetween, permitting entry of a liquid stream from the nozzle into the core therepast, said disk being of diameter intermediate that of the core and tips of bristles mounted on the core for preventing entanglement of brush bristles with fixed structure axially adjacent the end of the core, said disk being axially offset from the normal vehicle engaging portion of said brush, the core being free of such protective disks intermediate the ends thereof.

11. A rotary brush construction, particularly for top washing of vehicles, and adapted for mounting on a rotary shaft, comprising:
    a hollow cylindrical perforate core means mounting brush bristles thereon and adapted to loosely receive the shaft therethrough;
    at least a pair of split annular means spaced axially from each other within the core means for securing the core means to the shaft, each said annular means being mounted on the shaft for rotation therewith and having a substantially cylindrical outer surface means spaced radially from the shaft for backing the core, substantially radially extending portions associated with the annular means for circumferentially positioning the core means relative to the annular means, and tension means for pressing the core means against the annular means;
    said core means comprising a pair of longitudinally aligned cylindrical core sections having adjacent ends overlapping the outer surface means of one said annular means, so that said outer surface means extends into both said core sections, said tension means of said one annular means comprising elongate members extending substantially radially from the annular means and into fixed releasable engagement with corresponding ones of said core sections for holding the core section ends against said annular means and for preventing axial separation of said core sections.

12. The apparatus of claim 11 in which said annular means comprises a solid disk diametrally split to form an opposed pair of substantially hemi-circular axially imperforate segments, said radially extending portions being integral flat tabs diametrally opposed at the circumferential ends of each of said disk segments and extending diametrally outwardly therefrom into engagement with longitudinally extending, radially inwardly opening notches in said core means, and including means extending chordally through the disk periphery and securing the adjacent portions of the opposed disk segments to each other substantially in face to face relation with the shaft gripped therebetween.

13. A rotary top brush construction for washing of vehicle, and adapted for mounting on a rotary shaft, comprising:
    a hollow cylindrical perforate core fixedly mounting brush bristles and adapted to loosely receive said shaft therethrough, said core being circumferentially segmented, said core segments including mounting openings;
    a hub on said shaft and radially spaced within said core;
    plural and radially extending threaded tension means having inner ends secured to said hub, said threaded tension means extending through said mounting openings in said core segments for securing said core segments to said hub;
    spacer means interposed between said hub and core segments for holding said core in coaxial, radially spaced relation around said hub upon tightening of said threaded tension means;
    nozzle means for discharging liquid into an end of said core;
    a plurality of core support collars spaced axially along the core, each core support collar comprising a said hub, at least a pair of threaded tension means and a spacer means for each of said pair of tension means, each said tension means comprising an elongate threaded tension member, each said spacer means comprising a spacer adjacent the corresponding threaded member, the endmost collars each comprising a hub of diameter substantially less than the inside diameter of said core and at least four elongate threaded members and elongate coaxial spacers, two of said spacers being circumferentially centered on corresponding diametrally opposed core segments and the remaining pair of spacers engaging the length edge portion of the core segments.

14. A rotary top brush construction for washing of vehicles, and adapted for mounting on a rotary shaft, comprising:
    a hollow cylindrical perforate core fixedly mounting brush bristles and adapted to loosely receive said shaft therethrough, said core being circumferentially segmented, said core segments including mounting openings;
    a hub on said shaft and radially spaced within said core;
    plural and radially extending threaded tension means having inner ends secured to said hub, said threaded tension means extending through said mounting openings in said core segments for securing said core segments to said hub;
    spacer means interposed between said hub and core segments for holding said core in coaxial, radially spaced relation around said hub upon tightening of said threaded tension means;
    nozzle means for discharging liquid into an end of said core;
    a plurality of core support collars spaced axially along the core, each core support collar comprising a said hub, at least a pair of threaded tension means and a spacer means for each of said pair of tension means, each said tension means comprising an elongate threaded tension member, each said spacer means comprising a spacer adjacent the corresponding threaded member, at least axially inner ones of said collars each comprising a diametrally split hub, screw means on opposite sides of said shaft for securing the halves of said hub together with said shaft centrally sandwiched therebetween, said hub having a periphery close spaced from the inner periphery of said core, said threaded members comprising diametrally opposed screws centrally circumferentially disposed on said hub halves, said spacers comprising washer-like members on said screws, said hub halves having tabs extending radially to engage the length edges of said core segments.

15. A rotary top brush construction for washing of vehicles and mountable on a rotary shaft, comprising:

an elongated cylindrical core having outwardly projecting similar length bristles distributed circumferentially and axially over the surface thereof and forming a substantially continuous cylindrical wall of bristle tips circumferentially of and surrounding said core, said core comprising separate but axially adjacent cylindrical core sections, including an elongate intermediate core section and a pair of shorter flanking end core sections, and means for reducing entanglement of brush bristles with projecting trim items at and adjacent the sides of the vehicle to be washed and comprising an axial distribution density of brush bristles on the end core sections which is substantially less than the axial distribution density of brush bristles on said intermediate core section;

a plurality of collar means spaced axially along and fixed to said shaft for rotation therewith, ones of said collar means being disposed adjacent the outer ends of said end core sections for coaxially supporting same on said shaft for rotation therewith, and others of said collars being axially disposed at the axial interfaces between adjacent core sections for axially joining same together and coaxially fixing same to said shaft for rotation therewith.

16. The brush construction of claim 15 including a circumferentially and axially substantially uniform distribution of liquid openings through the peripheral wall of each of said cylindrical core sections, which openings are interdistributed between said bristles, axial passages between said collars and core for permitting axial travel continuously along the core interior wall of lubricant liquid, said collars being axially short with respect to the length of said core sections so as to minimize blockage thereby of said distribution of liquid openings through the core peripheral wall, and including pressurized wash liquid supply means having nozzles at the ends of said core and each aiming axially into said core a stream of lubricant liquid which passes the collars for providing a continuous and substantially even distribution of wash liquid outwardly through said liquid openings between said bristles for lubricating bristle contact with the surface of a vehicle to be washed and for assisting the reduced axial bristle density of said end sections in preventing tangling of end core section bristles with projecting trim items on the vehicle.

* * * * *